United States Patent Office 3,462,537
Patented Aug. 19, 1969

3,462,537
METHOD FOR COMBATING MITES AND TICKS
Wilhelm Merk, Reinach, Basel-Land, Switzerland, assignor to Ciba Limited, Basel, Switzerland, a company of Switzerland
No Drawing. Filed Oct. 25, 1966, Ser. No. 589,224
Claims priority, application Switzerland, July 5, 1966, 9,749/66
Int. Cl. A01n 9/20
U.S. Cl. 424—326                    4 Claims

ABSTRACT OF THE DISCLOSURE

Novel preparations and methods are provided for combating ectoparasites, especially mites and ticks. The preparations contain as active principle the compound of the formula

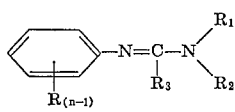

in which R represents halogen, lower alkyl, alkoxy, haloalkyl or phenoxy which may be substituted by halogen, lower alkyl, alkoxy, or halo-alkyl, or the group —$CF_3$, —$NO_2$, —CN, —SCN, $n$ represents an integer from 1 to 4, $R_1$ represents alkyl and $R_2$ and $R_3$ are hydrogen or alkyl. The compositions are applied to the area to be protected in a parasitically effective amount.

---

The present invention relates to preparations for combating ectoparasites, especially mites, which preparations comprise, as active principle, a compound of the general formula

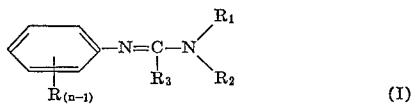

(I)

in which R represents a halogen atom, a low alkyl radical, an alkoxy radical, a halogen-alkyl radical or a phenoxy radical which may be substituted by at least one halogen atom or a low alkyl, alkoxy or halogen-alkyl radical, or the group —$CF_3$, —$NO_2$, —CN, —SCN, $n$ represents an integer within the range of from 1 to 4, $R_1$ represents an alkyl radical having from 1 to 3 carbon atoms, $R_2$ and $R_3$ may be identical or different and represents a hydrogen atom or a low alkyl group, it being possible for the radicals $R_1$ and $R_2$, together with the nitrogen atom, to form components of a heterocyclic ring, or the salts of the said compounds, together with a carrier. The carrier used may include one or more of the following additives: a solvent, a diluent, a dispersing agent, a wetting agent, an adhesive, a fertilizer and other pesticides.

Active substances especially suitable for use in the preparations are those of the general formula:

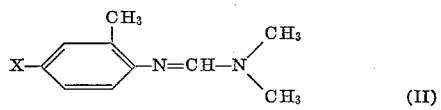

(II)

in which X represents a fluorine atom, a chlorine atom, a bromine or an iodine atom. The compounds of the general formula I are prepared by the usual methods used for amidine formation, for example, by heating the appropriate arylisocyanates with an N,N-disubstituted amide of a low-molecular-weight carboxylic acid, for example, dimethylformamide: the course of the reaction can easily be followed by the evolution of $CO_2$ which occurs.

As has already been mentioned, the new preparations are highly effective against ectoparasites, for example, *Boophilus microplus*, *Psoroptes ovis* or *Dermanyssus gallinae*.

As has been mentioned above, the new preparations may contain other additives in addition to the active principles of the general Formulae I and II. Thus, the new active principles can be made up in a very wide variety of forms, and these are described in the following:

When preparing solutions of the compounds of the general Formula I which can be used directly as sprays, there are used, for example, mineral oil fractions having a high to medium boiling range, for example, Diesel oil or kerosene, coal-tar oils and oils of vegetable or animal origin, and also hydrocarbons, for example, alkylated naphthalenes and tetrahydronaphthalene, if necessary, in the presense of xylene mixtures, cyclohexanols, ketones, and also chlorinated hydrocarbons, for example, trichloroethane, and tetrachloroethane, trichloroethylene or trichlorobenzene and tetrachlorobenzene. It is expedient to use organic solvents having a boiling point above 100° C.

Preferably, aqueous preparations are made from emulsion concentrates, pastes or wettable powders by adding water. Suitable emulsifying or dispersing agents are nonionic products, for example, condensation products obtained from aliphatic alcohols, amines or carboxylic acids having a long-chain hydrocarbon radical containing about 10 to 20 carbon atoms and ethylene oxide, for example, the condensation product of octadecyl alcohol and 25 to 30 mols of ethylene oxide, or that of soybean fatty acid and 30 mols of ethylene oxide, or that of commercial oleylamine and 15 mols of ethylene oxide, or that of dodecylmercaptan and 12 mols of ethylene oxide. Suitable anionic emulsifying agents are the sodium salt of dodecyl alcohol sulphuric acid ester, the sodium salt of dodecylbenzene sulphonic acid, the potassium or triethanolamine salt of oleic acid or abietic acid or mixtures of these acids, or the sodium salt of a petroleum sulphonic acid. Suitable cationic dispersing agents are quaternary ammonium compounds, for example, cetylpyridinium bromide or dihydroxyethylbenzyldodecylammonium chloride.

Preparations for application by dusting and strewing can be made with solid excipients, for example, talcum, kaolin, bentonite, calcium carbonate, calcium phosphate, and also carbon, cork meal, wood meal and other materials of vegetable origin. It is also especially advantageous to use the preparations in granular form. The various kinds of preparation may be provided in the usual manner with substances which improve dispersion, adhesion, resistance to rain and also penetrating power. Examples of such substances are fatty acids, resins, glues, casein and alginates.

The following are active compounds of importance which can be used in the preparation of the invention:

I.

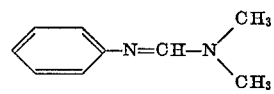

II.

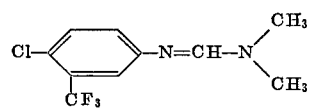

III.

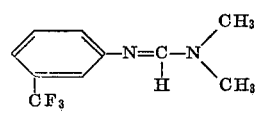

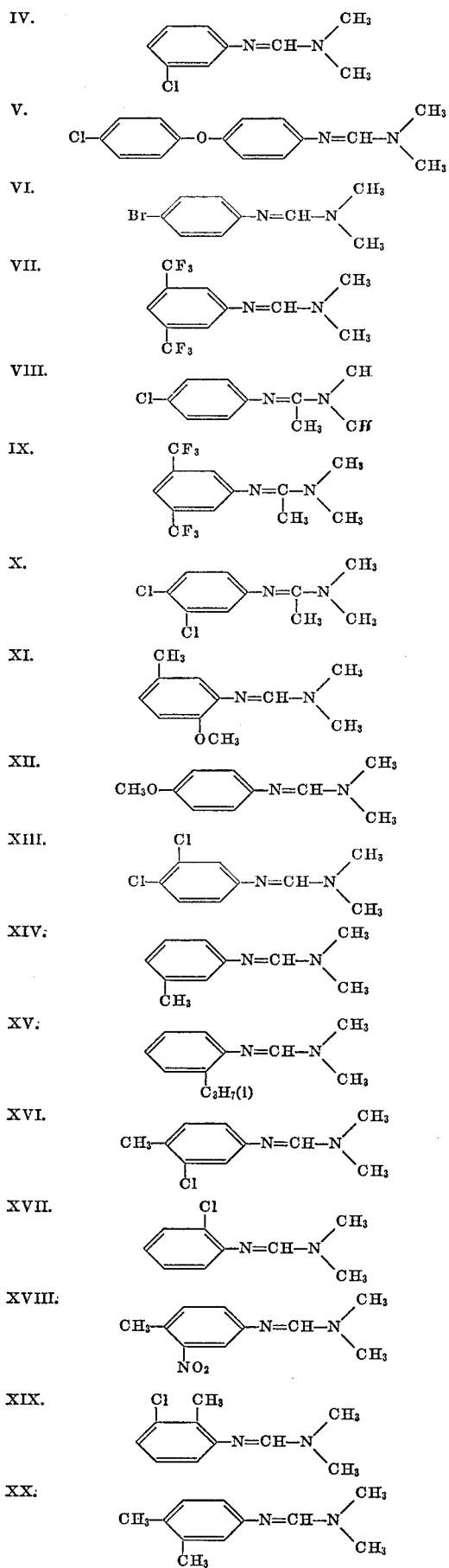
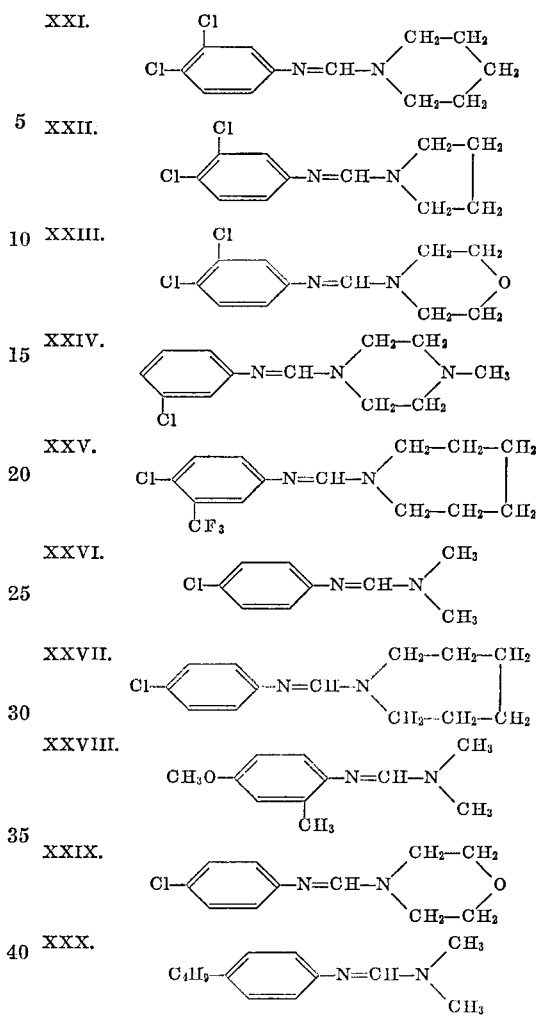

Especially important active principles are those of the Formula II in which X represent a fluorine atom, a chlorine atom, a bromine or an iodine atom. In particular, N-(2-methyl-4-chlorophenyl)-N-dimethylformamidine is of great important in the combating of mites.

The preparations of the invention may be used to combat ectoparasites either alone or together with other known pesticides, for example, insecticides, acaricides, and so forth.

Application of the preparations in the veterinary field is effected by the usual methods, for example, by spraying, pouring, dusting and fumigating. An effective method of treating cattle is by use of a cattle dip, by driving the animals through a solution or emulsion of the preparation.

The following examples illustrate the invention.

Example 1

20.2 kilograms of N-(2-methyl-4-chlorophenyl)-N'-dimethylformamidine together with 5 kg. of Emulsogen I 50 (a mixture of a condensation product of approximately 1 mol of tributylphenol and 30 mols of ethylene oxide and the calcium salt of dodecylbenzenesulphonic acid) are dissolved in 65.8 kg. of xylene. A 20% emulsion concentrate is obtained which can be diluted with water as required. The 50% concentration concentrate contains 50.5 kg. of the above-mentioned active principle, 5 kg. of Emulsogen I 50, 32.5 kg. of xylene and 10 kg. of methanol.

Example 2

The active principle mentioned in Example 1 kills *Boophilus microplus* within a short period of time, in a concentration of 100 to 200 p.p.m. It is lethal to both larvae and adults. This is of great importance because the pest

*Boophilus microplus* is showing increasing resistance to phosphoric acid esters and carbamates.

Example 3

A field test was carried out with sheep naturally infested with *Psoroptes ovis*. The animals were driven through a dip containing 0.12% of active principle in the form of an emulsion (active principle of Example 1). The contact time was 30 seconds. The sheep were subjected to careful examination after a period of two weeks, and it was established that they were quite free from parasites. A check carried out three months later showed that the animals were still free from infestation.

Example 4

On a large chicken farm, a chicken coop heavily infested with *Dermanyssus gallinae* was sprayed with a 0.5% emulsion of the active principle described in Example 1. All walls and the roof were thoroughly sprayed; the chicken remained in the run, but were not touched by the emulsion. No trace of mites could be found when examinations were carried out 20 days and 30 days later. The hens displayed no abnormalities, had normal appetites and displayed the normal laying activity.

The wooden walls, metal sections and perches of a chicken coop heavily infested with mites, mainly in the drippings, were treated with 28%₀₀ cubic metres or 72 grams of active principle per 100 square metres. The hens remained in the coop during the treatment. Those mites that were not covered by hen droppings came into direct contact with the spray and died immediately subsequent to application. Nine check points were selected. 6 days subsequent to the treatment a few live mites were found at only two of the nine check points. On the 12th day subsequent to the treatment no live mites could be found at any of the nine check points.

What is claimed is:

1. The method for combating mites and ticks, which comprises applying to the area whereon the said effect is desired a parasiticidal amount of a compound of the formula

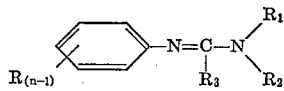

wherein R represent a member selected from the group consisting of chlorine, bromine, the group —CF$_3$, the group —NO$_2$, lower alkyl and lower alkoxy, $n$ represents a number of at most 3, R$_1$ represents an alkyl radical of at most 3 carbon atoms, R$_2$ represents hydrogen or alkyl having 1–3 carbon atoms and R$_3$ represents a member selected from the group consisting of hydrogen and methyl.

2. A method as claimed in claim 1, wherein there is used as active principle a salt of a compound as defined in claim 1.

3. A method as claimed in claim 1, wherein there is used as active principle a compound of the formula

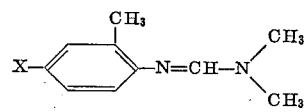

wherein X represents a member selected from the group consisting of fluorine, chlorine, bromine and iodine.

4. A method as claimed in claim 1, wherein there is used as active principle the compound of the formula

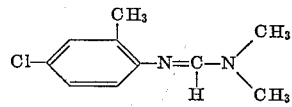

References Cited

UNITED STATES PATENTS

| | | | |
|---|---|---|---|
| 3,108,038 | 10/1963 | Fielding et al. | 167—30 |
| 3,179,557 | 4/1965 | Hausweiler et al. | 167—30 |
| 3,214,334 | 10/1965 | Freund et al. | 167—30 |

ALBERT T. MEYERS, Primary Examiner

D. M. STEPHENS, Assistant Examiner